Jan. 24, 1933. J. LORIMOR 1,895,384
AUTOMOBILE GEAR PIN
Filed May 9, 1932

John Lorimor
INVENTOR
BY Victor J. Evans & Co.
ATTORNEYS

Patented Jan. 24, 1933

1,895,384

UNITED STATES PATENT OFFICE

JOHN LORIMOR, OF IMOGENE, IOWA

AUTOMOBILE GEAR PIN

Application filed May 9, 1932. Serial No. 610,191.

This invention relates to differential spider gear pins and has for the primary object, the provision of a device of the above stated character whereby lubricant may be accumulated and distributed to spider gears and portions of the pins on which the gears are journalled to reduce friction to a minimum and obviating binding or freezing of the gears to the pins due to lack of lubrication.

Another object of this invention is the provision of means for preventing shifting endwise of the pin in its mounting should the anchoring means therefor become free or broken, consequently obviating the possibility of the pin working out of position and engaging the differential or the gears thereof and said means also providing a medium in which the lubricating medium may be formed.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating the differential with pins for supporting the spider gears thereof and constructed in accordance with my invention.

Figure 1:
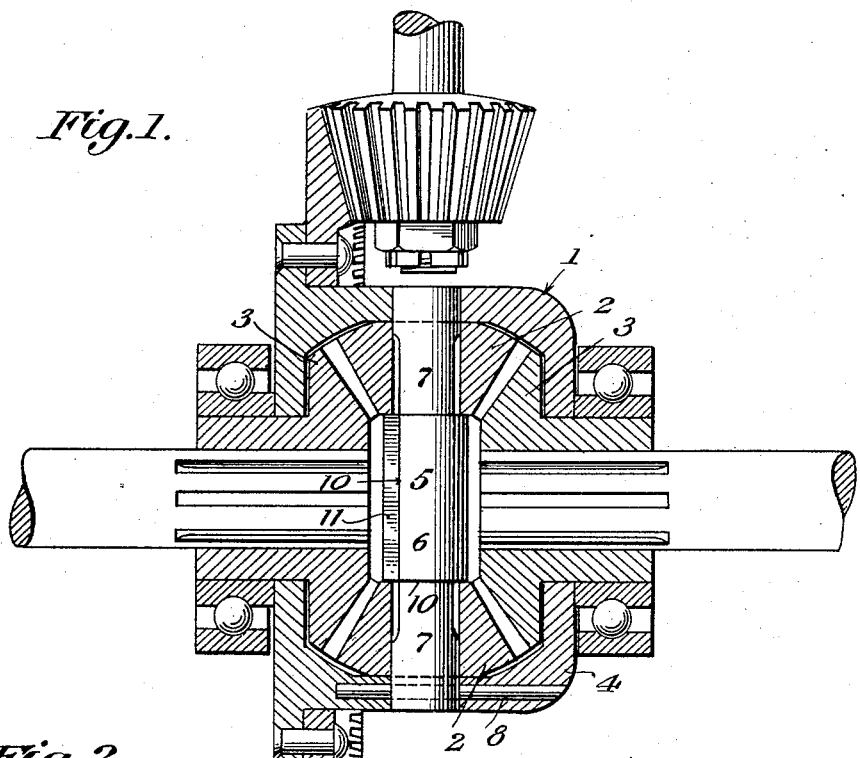
Figure 2:
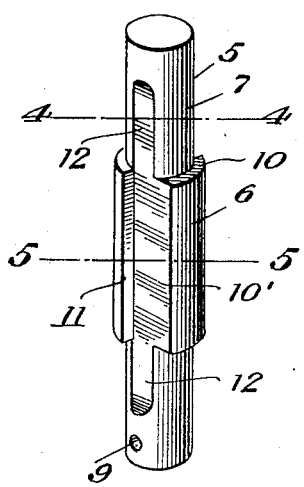
Figure 2 is a perspective view illustrating the pin.
Figure 3:
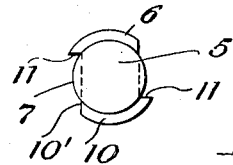
Figure 3 is an end view illustrating the same.
Figure 4:
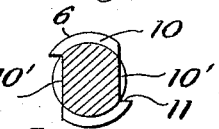
Figure 4 is a sectional view taken on the line 4—4 of Figure 2.
Figure 5:
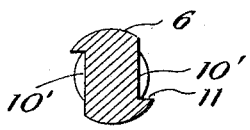
Figure 5 is a similar view taken on the line 5—5 of Figure 2.

Referring in detail to the drawing, the numeral 1 indicates a conventional type of differential used on motor vehicles employing the usual spider gears 2 between the axle pinions 3 and located within the ring gear mounting or housing 4. The spider gears 2 are journalled on a pin 5 constructed in accordance with the present invention. The pin 5 consists of an intermediate portion 6 of a diameter greater than the end portions 7 on which the spider gears are journalled. The end portions 7 extend into openings in the ring gear mounting 4 and are anchored thereto by a pin 8 extending through an opening 9 in the pin. The intermediate portion 6 or the ends thereof form annular shoulders 10 engageable with the spider gears 2 and with said gears located between the shoulders and the ring gear mounting will prevent endwise shifting of the pin should its anchoring means become free or unfastened consequently obviating any possibility of the pin shifting its position so as to contact with parts during the operation of the differential which would tend to break or destroy such parts.

The intermediate portion 6 is located between the axle gears 3 and is provided on opposite sides thereof with flattened portions 11 forming lubricant reservoirs to receive lubricant contained within the usual differential housing surrounding the differential. Each flattened portion 10 at one side edge terminates into an abrupt shoulder 11 adapted to act as scoops or mediums for catching the lubricant within the flattened portions during the rotation of the differential unit. The portions 7 of the pin have channels or grooves 12 communicative with the flattened portions 10 so that the lubricant caught thereby may pass into said channels within the hubs of the spider gears thereby effectively lubricating the spider gears and the portion 7 on which said gears rotate reducing friction to a minimum and preventing any possibility of the spider gears freezing to the pin due to lack of lubrication.

While I have shown and described the preferred embodiment of my invention, it will be understood that minor changes in construction, combination and arrangement of parts may be made without departing from the spirit and scope of my invention, as claimed.

Having thus described my invention, what I claim is:—

In combination with a differential having a ring gear mounting with axle pinions and spider gears located therein, a pin having end and intermediate portions with said end portions secured to the mounting and with the spider gears journalled thereon and abutting the intermediate portion, said intermediate portion having flattened portions to catch lubricant, said end portions having channels communicative with the flattened portions to receive lubricant therefrom and to direct the lubricant to the hubs of the spider gears and about the end portions.

In testimony whereof I affix my signature.

JOHN LORIMOR.